United States Patent [19]
Morris

[11] 3,923,102
[45] Dec. 2, 1975

[54] TOOL FOR EDGING AROUND SPRINKLER HEADS

[76] Inventor: Allen H. Morris, 3039 Glendon Ave., Los Angeles, Calif. 90034

[22] Filed: Jan. 21, 1974

[21] Appl. No.: 435,202

[52] U.S. Cl. ............................. 172/13; 130/DIG. 7
[51] Int. Cl.² ............................................ A01D 35/00
[58] Field of Search ............ 56/295, 255, 256, 17.5, 56/17.4; 30/300, 301, DIG. 7, 347, 276; 172/13–18, 545

[56] References Cited
UNITED STATES PATENTS

| | | | |
|---|---|---|---|
| 1,211,566 | 1/1917 | Fortney | 241/292.1 |
| 2,312,569 | 3/1943 | Maga | 172/15 |
| 2,724,230 | 11/1955 | Burmeister | 56/17.4 |
| 2,792,770 | 5/1957 | Ober | 172/111 X |
| 2,886,117 | 5/1959 | Benson | 172/545 |
| 3,022,621 | 2/1962 | Zavarella | 56/295 |
| 3,127,939 | 4/1964 | Rink | 172/13 |
| 3,133,597 | 5/1964 | Smith | 172/14 |

*Primary Examiner*—Russell R. Kinsey
*Attorney, Agent, or Firm*—Antonio M. Fernandez

[57] ABSTRACT

A lawn edger, normally having a flat blade driven in a vertical plane for edging the perimeter of a lawn and in a horizontal plane for trimming, is provided with a U-shaped blade having a transverse section which rotates in a plane parallel to the plane of rotation of the flat blade, and end sections perpendicular to the transverse section. When the transverse section is rotating in a horizontal plane over a sprinkler head, the leading edges of the end sections cut vertically into the grass and root structure. A segment of each end section trailing and leading edge thereof is bent inwardly towards the axis of rotation. The end segments break up the cut grass and root structure, and propel the debris up and out of the circular area being cut around a sprinkler head.

4 Claims, 6 Drawing Figures

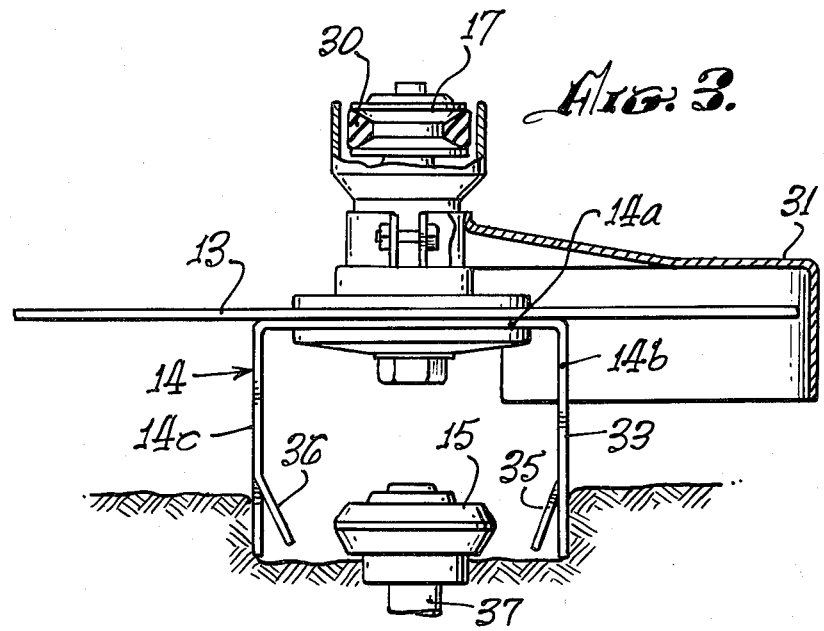
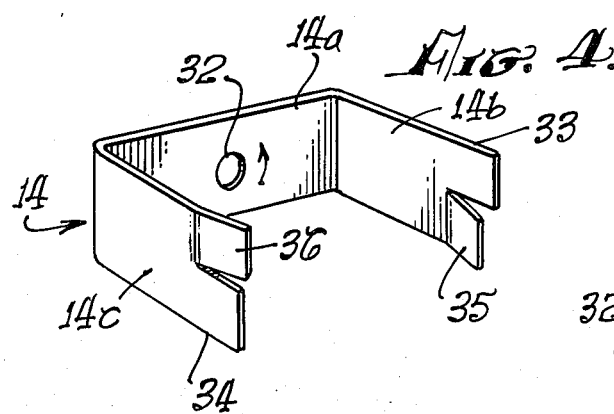
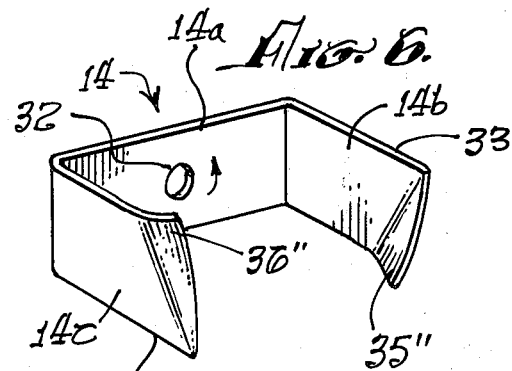
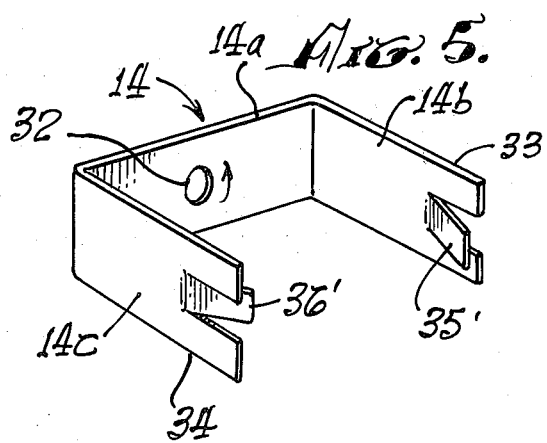

TOOL FOR EDGING AROUND SPRINKLER HEADS

BACKGROUND OF THE INVENTION

This invention relates to a lawn edger and trimmer, and more particularly to a motor driven rotary blade for edging around sprinkler heads.

Lawn sprinkling systems in common use, particularly in residences, employ underground pipes to feed sprinkler heads. The heads are usually even with the ground, or slightly recessed, to permit a reel or rotary-blade lawn mower to pass over them. For proper sprinkling, the grass around the heads must be kept trimmed to a point at least below the perforations of the heads through which water jets spray the lawn. Otherwise the grass will interfere with the water jets and cause some areas to be deprived of water while other areas are caused to be swamped. If the area of the head becomes swamped to a level above the sprinkler head perforations, the jets from the heads will be broken up at the head, and the area around the head will become flooded.

It has been the practice to trim around sprinkler heads using hand shears in order to keep clear the path of the sprinkler head jets, but professional gardeners find that hand trimming is too time consumming and strenuous. They prefer to use motor-driven grass trimmers and edgers which have been developed for edging the grass along the perimeter of a lawn and for trimming the lawn in places too hard to reach with a lawn mower. Such trimmers and edgers consist of a flat blade with a drive mechanism which can be adjusted for rotation in a vertical plane while edging the lawn by cutting the grass to a depth sufficient to also cut the root structure. By adjusting the blade drive mechanism to rotate the blade in a horizontal plane, the same machine can be used for trimming the lawn, such as under bushes and close in around objects that cannot be moved.

In order to use such an edger and trimmer, or any edger, to edge around sprinkler heads, the practice has been to make a triangular cut around the heads with a blade rotating in a vertical plane. That pracitice is effective in keeping the path of jets from the sprinkler heads clear, but the area cut out in the lawn around the heads is more than is necessary, and is not asthetically as satisfactory as a circular cut would be. It also is more time consuming because each sprinler head requires three cuts so that the gardener must position the edger three times, and lower and raise the cutting blade once for each position. It would be advantageous to be able to edge all around the sprinkler head from one position.

Some edgers, such as the one disclosed in U.S. Pat. 2,909,021 by James H. McLane of McLane Tool & Dye Company, provide for the adjustment of the blade to cut at other angles between the vertical and horizontal positions. If the blade is set at some acute angle, such as 60° from the vertical, a conical cut could be made by walking the edger close around the sprinkler heads. That may take less time than making three vertical cuts, but would be more strenuous because it would require more care to be taken in the process to keep from striking the head and the upright pipe connecting it to be buried feed pipes.

What is required to make trimming around a sprinkler head easier is a blade that will make a circular cut. Manual tools have been suggested for that, but commercial gardeners would prefer power-driven tools. In a U.S. Pat. No. 1,857,383, there is disclosed a plunger type tool employing a centering means which has a conical lower face adapted to fit over the sprinkler head and an annular flange that serves as a stationary cutting edge over which a hollow cylinder is plunged to cut any blades of grass trapped between the flange of the centering means and the cylindrical plunger. U.S. Pat. No. 2,809,864 shows a similar tool, but having the centering means formed as a separate inverted cup. Another cup which fits over the centering cup is moved downwardly to cut any grass blades trapped between the centering cup and the downwardly-moving cutting cup. In both of these arrangements it would be necessary to manually pull out any uncut grass left inside the centering means or cup.

In another arrangement disclosed in U.S. Pat. No. 2,691,823, the centering means is again formed as an inverted cup or hollow cylinder and is provided with teeth to serve as a cutting member when the centering means is turned on its axis. A disc or blade carried by an arm extending radially from the centering means cuts a circle of a larger diameter as the centering means is manually rotated by twisting a rod extending upwardly. An annular piece of sod thus cut around the sprinkler head must evidently be removed manually in order to fully clear the sod thus cut from around the head.

An arrangement adapted to be power driven is shown in U.S. Pat. No. 3,555,680. There an inverted hollow cylinder fits over the sprinkler head to center another inverted hollow cylinder of larger diameter around the head. Both cylinders rotate on the same shaft. An outer casing which does not rotate with the shaft serves to steady the entire arrangement while the shaft is pushed downwardly toward the sprinkler head against the force of a helical spring. Two diametrically opposed cutting blades are attached to the outer cylinder in positions parallel with the outer cylinder axis and extending beyond the open end of the outer cylinder. As the outer cylinder is rotated with the inner cylinder, an annular piece of sod is cut around the sprinkler head. Again, the annular sod just cut evidently must be manually removed from around the sprinkler head.

In another motor-driven arrangement disclosed in U.S. Pat. No. 3,174,224, a wire mesh serves the same purpose as the outer casing in the preceding arrangement just described. A shaft pushed down towards the sprinkler head against the force of a helical spring carries the motor on its lower end. The shaft of a motor is oriented vertically and is adapted to carry a blade comprised of a continuous piece of strap steel looped to have an arcuate lower portion that is shaped to make a conical cut in the grass. An idler journaled in the center of the arcuate lower portion of the blade prevents the blade from cutting below the top of the sprinkler head. This arrangement is unsatisfactory because it only trims the ends of the grass blades which extend above the top of the sprinkler head and does not cut the grass and root structure around the sprinkler head to forstall any immediate growth that may interfere with the jets of the sprinkler head. To trim the grass blades very close around a sprinkler head to some level below the top of the sprinkler head, an auxiliary blade is attached to the main arcuate blade. The auxiliary blade is comprised of a flat piece of material turned downwardly and angularly outwardly at each end. The auxiliary blade is fastened to the bottom of the main cutting blade. This auxiliary blade augments the trimming provided by the main blade but still does not provide for edging, using the term "edging" as a term of art to mean cutting vertically to a depth sufficiently to cut the grass down at least to a point near the root structure and preferably cutting into the root structure.

What is required is a motor-driven cutting blade adapted to not only cut vertically in a circle around the sprinkler head to a depth well below the head, but to also clear out the debris inside the circular area around the head.

SUMMARY OF THE INVENTION

In accordance with the present invention, a power-driven apparatus comprising a carriage with wheels, and a power motor on the carriage, is adapted for edging a circular area in sod close around a sprinkler head by a U-shaped blade comprised of strap steel having a horizontal section and two end sections perpendicular to the horizontal section. Both end sections extend in the same direction from the horizontal section. Means for turning the blade about a vertical axis is coupled to the power motor. Each end section has a leading edge for cutting and a trailing segment bent inwardly toward the vertical axis of rotation. The trailing segments break up the sod being cut by the leading edges, and propel the sod thus cut and broken up away from the circular cut being made. The trailing segment may be a portion of the end section cut therefrom by one or two cuts parallel to the leading edge. In the case of two cuts, the portion between the cuts is bent inwardly. The trailing segment may also be the inwardly bent corner of an end section remote from the leading edge.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 3 is an enlarged side elevation view of the U-shaped blade edging around a sprinkler head.

FIG. 4 is a perspective view of the U-shaped blade shown in FIGS 1–3.

FIG. 5 is a perspective view of a variant in the U-shaped blade of FIG. 4.

FIG. 6 is a perspective view of a second variant of the U-shaped blade of FIG. 4.

DESCRIPTION OF THE PREFERRED EMBODIMENTS

Figure 1:
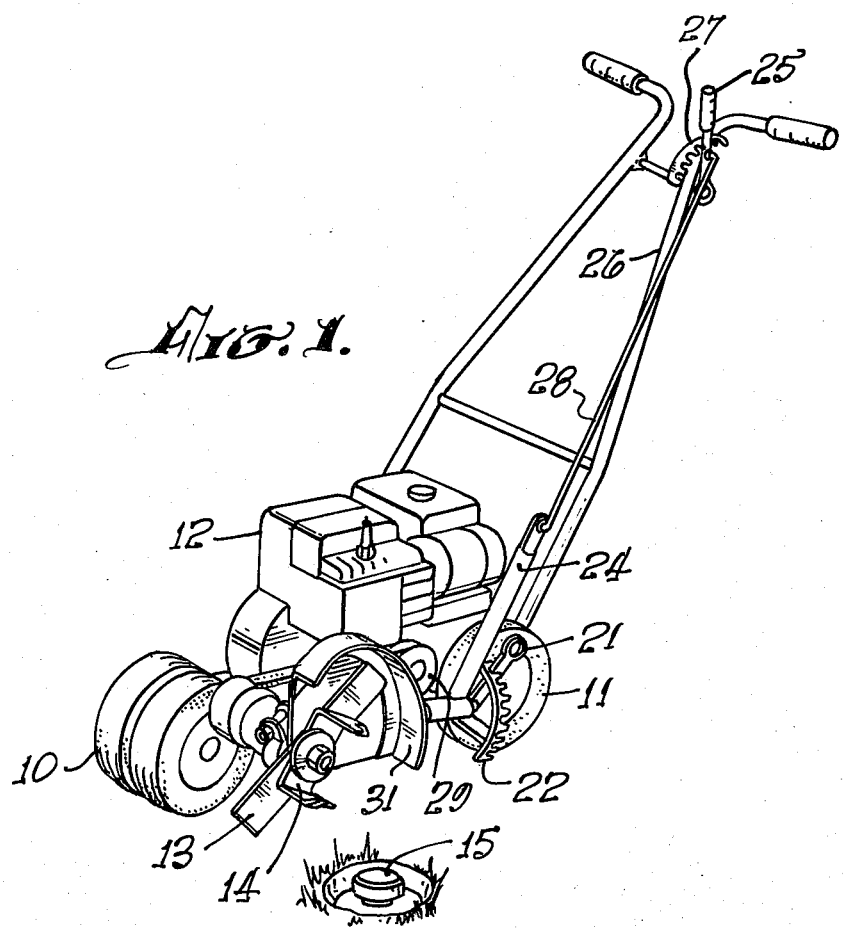
FIG. 1 is a perspective view of a grass edger adapted with a U-shaped blade formed in accordance with the present invention for trimming around a lawn sprinkler head.

Referring now to FIG. 1, there is shown in FIG. 1 a lawn trimming and edging apparatus of a type disclosed in the aforesaid U.S. Pat. No. 2,909,021. However, as will become apparent from the following description, this apparatus is exemplary of the type of apparatus in which the present invention may be practiced. Consequently, the apparatus to be described is by way of example and not by way of limitation.

The apparatus is comprised of a carriage having a pair of wheels 10 in front and a pair of more widely spaced wheels 11 in back. A gasoline engine 12 is mounted on the carriage for rotating a flat blade 13 in a vertical plane while edging along the perimeter of a lawn. The apparatus normally could be adjusted for rotation of the blade 13 in a horizontal plane while trimming grass in hard to reach places, such as under bushes or against objects which cannot be moved, but in accordance with the present invention, a second blade 14 is attached on top of the flat blade in order to edge around a lawn sprinkler 15 when the apparatus is adjusted for rotation of the flat blade in a horizontal plane.

Figure 2:
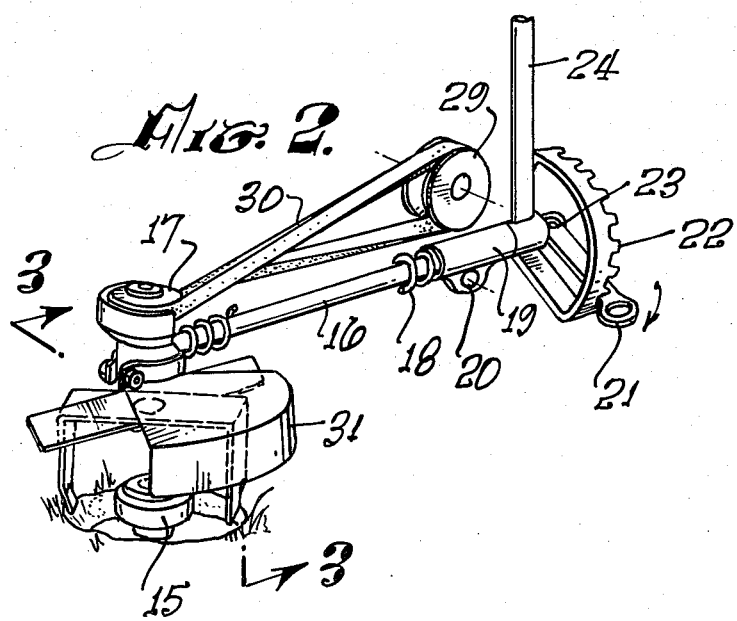
FIG. 2 is an enlarged view of a portion of the apparatus of FIG. 1 showing the U-shaped blade in a position for edging around a sprinkler head.

This adjustment of the flat blade 13 from a vertical to a horizontal cutting position is achieved by a mechanism more clearly shown in FIG. 2. That mechanism consists of a rod 16 which supports a driven pulley 17 connected to the blades. A helical spring 18 maintains the rod under some tension between the driven pulley 17 and a sleeve 19 pivoted on a pin through a hole 20. A detent 21 is maintained in slots of a curved rack 22 by the tension on the rod 16. When the detent 21 is caused to pivot outwardly on a pin 23, the tension on the rod is increased as the helical spring 18 is compressed, but the detent 21 can then be moved to another slot such as to the uppermost slot, to rotate the shaft 16 and thus place the flat blade 13 in a position to rotate in a vertical plane as shown in FIG. 1. When the detent is in the lowermost slot as shown in FIG. 2, the flat cutting blade 13 is in position for rotating in a horizontal plane as shown in FIG. 2. With the detent 21 in an intermediate slot, the flat blade 13 will rotate in a plane at some acute angle between the horizontal and the vertical planes. However, the intermediate slots of the rack 22 are not of any immediate concern in practicing the present invention, which is in using the U-shaped blade 14 for edging around the sprinkler head 15 when the drive shaft of the blade is in a vertical position.

Once the apparatus of FIG. 1 has been adjusted to place the end sections of the cutting blade 14 in a vertical position as shown in FIG. 2, the cutting blade can be lowered to cut around the sprinkler head 15 to a depth limited only by the length of the vertical end sections. The mechanism for lowering the blade 14 consists of a lever 24 which is linked to a control lever 25 pivoted on a handle bar 26 and held in position by a rack 27. The link between the lever 24 and the lever 25 is a thin rod 28.

A drive pulley 29 is driven by the gasoline engine 12 with the axis of the drive pulley 29 behind the pivot 20 for the sleeve 19 which holds the rod 16. Consequently, when the lever 24 is moved rearwardly, the end of the rod 16 pivots upwardly to lift the blade 14 up away from the sprinkler head. As the rod 16 rotates upwardly, tension on a drive belt 30 is decreased to a point where there is not sufficient friction on the pulleys to permit turning the driven pulley 17. With the rod 16 pivoted upwardly, the cutting blade 14 is thus not in motion. When the apparatus has been properly positioned to lower the cutting blade 14 over the sprinkler head 15, the lever 24 is moved forward to pivot the rod 16 downwardly, thus lowering the cutting blade 14 in a position to cut around the sprinkler head 15. As that takes place, tension on the belt 13 is restored to provide power to the driven pulley 17. As the lever 24 is moved further forward with the control lever 25 through the connecting rod 28, the blade 14 is lowered further around the sprinkler head 15 to cut deeper and deeper. As the depth of the cut is increased, more tension is placed on the belt 30, but that only increases friction between the belt and the pulleys for more positive drive of the cutting blade.

For normal edging along the perimeter of the lawn, the axis of the driven pulley 17 is rotated to a horizontal position, thus placing the flat cutting blade 13 in a position for cutting in a vertical plane. The blade 14 now not in use may be left on the apparatus. For normal trimming under bushes and close to objects that cannot be moved, the blade 14 is removed and the axis of the driven pulley is again rotated to a vertical position to place the flat cutting blade 13 in a horizontal position. Having to remove the blade 14 for trimming is not a great inconvenience because all of the edging can be completed around the perimeter of the lawn and around all sprinkler heads before any trimming with the apparatus is undertaken, or after all trimming has been completed.

Referring now to FIG. 3, there is shown an enlarged view of the driven pulley 17 rotated to the vertical position to place the blade 14 in position for edging around the sprinkler head 15. The view in FIG. 3 is of the front of the apparatus placing a shield 31 in the rear so that all of the blade 14 can be clearly seen. The shield is to protect the operator of the apparatus walking behind the apparatus from the flat cutting blade 13 and any debris thrown by the blade.

The U-shaped blade 14 shown in a perspective view in FIG. 4 is comprised of a transverse section 14a and end sections 14b and 14c perpendicular to the transverse section 14a. The transverse section has a hole 32 for the drive shaft connecting the blade to the driven pulley 17. The driven pulley rotates the blade in a clockwise direction as viewed from the top in FIG. 3. Consequently, edges 33 and 34 of the end sections 14b and 14c respectively, constitute the cutting edges of the blade. Trailing the cutting edges are segments 35 and 36 which are bent inwardly towards the axis of rotation of the blade. They serve to break up the blades of grass and root structure being cut by the leading edges and to propel the debris up and away from the circular area being cut by the rotating blade 14. In that manner, as the circular area around the sprinkler head is cut, the annular sod between the circle being cut by the leading edges of the blade and the upright connecting pipe is being broken up and ejected from the circular area.

To increase the size of the area being cleared, and to assure that all debris is cleared, the operator can move the carriage of the apparatus gently backward and forward and from side to side, thus displacing the axis of rotation of the blade from the center of the sprinkler head. However, once edging has been completed around the sprinkler head to the depth desired the first time, it will not be necessary to shift the axis of rotation about the center of the sprinkler head unless so much time lapses from one edging to another that sod fills in the cut. It will normally be sufficient to lower the U-shaped blade 14 over the sprinkler head to the depth desired and to edge the outside of the cut previously made.

Variants of the U-shaped blade 14 are shown in FIGS. 5 and 6. In FIG. 5, segments 35' and 36' of the end sections 14b and 14c are cut from the center of the end sections, but otherwise bent inwardly in the same manner and for the same purpose as the segments 35 and 36. In the embodiment of FIG. 6, discrete segments are not cut from the end sections as in the U-shaped blades of FIGS. 4 and 5. Instead, segments 35'' and 36'' are left fully attached to the rest of the end sections 14b and 14c. Since the leading edges 33 and 34 are to be straight and substantially perpendicular to the transverse section 14a, the segments 35'' and 36'' are bent invwardly progressively less from a maximum at one end remote from the leading edges to a point where there is no further bend at the tip end. In other words, in the variant of FIG. 5, the segments 35'' and 36'' are formed by turning in the corners of the sections 14b and 14c remote from the respective leading edges 33 and 34.

Although particular embodiments of the invention have been described and illustrated herein, it is recognized that modifications and equivalents may readily occur to those skilled in the art and consequently, it is intended that the claims be interpreted to cover such modifications and equivalents.

What is claimed is:

1. In a power-driven apparatus, including a carriage with wheels and a power motor on the carriage, a U-shaped edging blade for cutting a circular area in sod close around a lawn sprinkler head and means coupled to said power motor for turning said blade about a vertical axis, said blade being comprised of strap steel having a horizontal section of a length equal to the diameter of the circular area to be cut, said horizontal section being centered on said vertical axis and two end sections perpendicular to said horizontal central section, one end section extending downwardly from said horizontal section at each end thereof, and each end section having a leading edge for cutting and a trailing segment bent inwardly toward said vertical axis for breaking up sod being cut by the leading edge and for propelling sod thus cut and broken up away from the circular cut being made, whereby cut and broken up sod is propelled out and away from said circular area.

2. The combination of claim 1 wherein each trailing segment is a portion of an end section cut therefrom by at least one cut parallel to said leading edge.

3. The combination of claim 1 wherein each trailing segment is a portion of an end section between two cuts parallel to said leading edge.

4. The combination of claim 1 wherein each trailing segment is a corner of an end section remote from said leading edge, said corner being bent inwardly.

* * * * *